Patented Feb. 10, 1925.

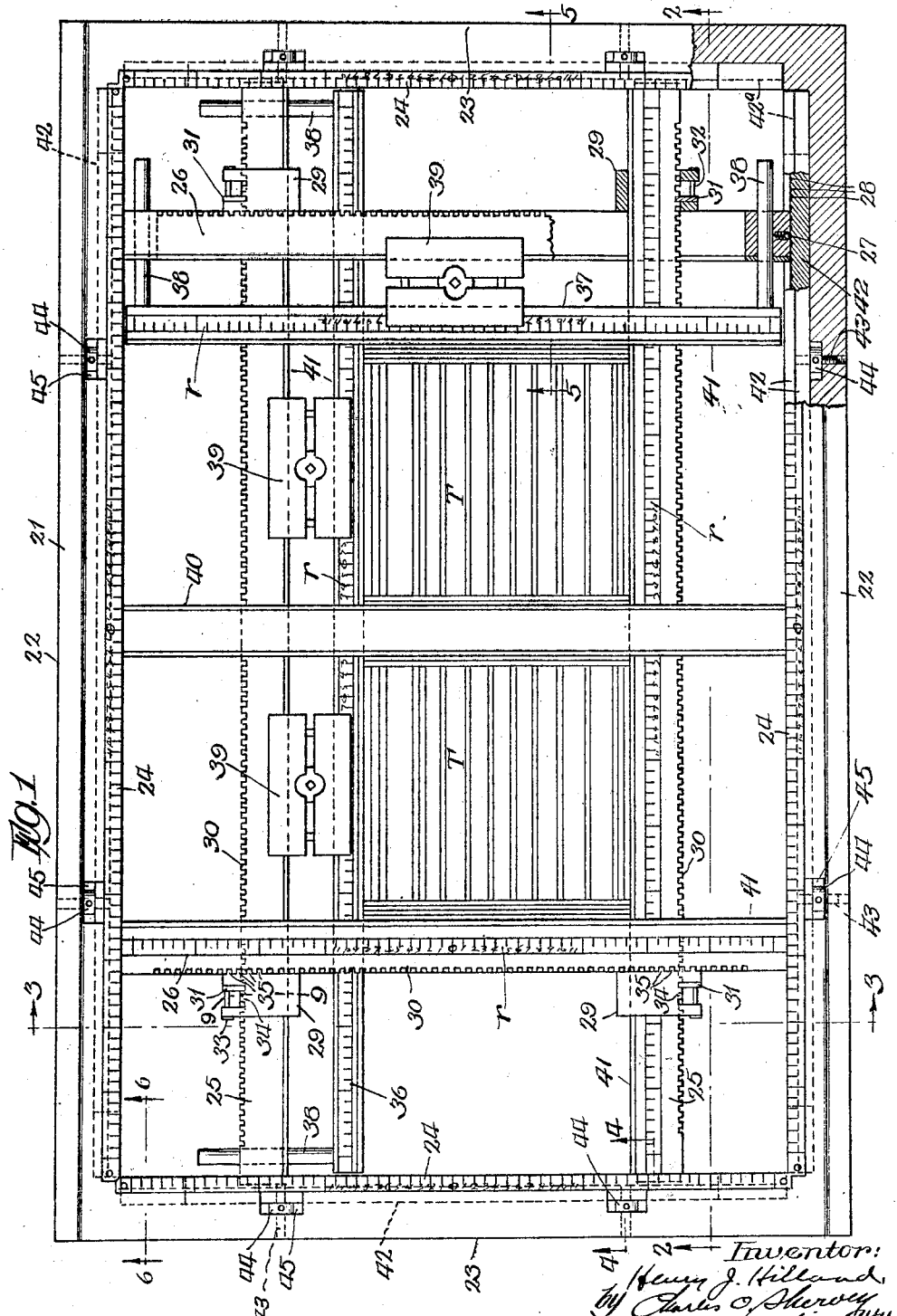

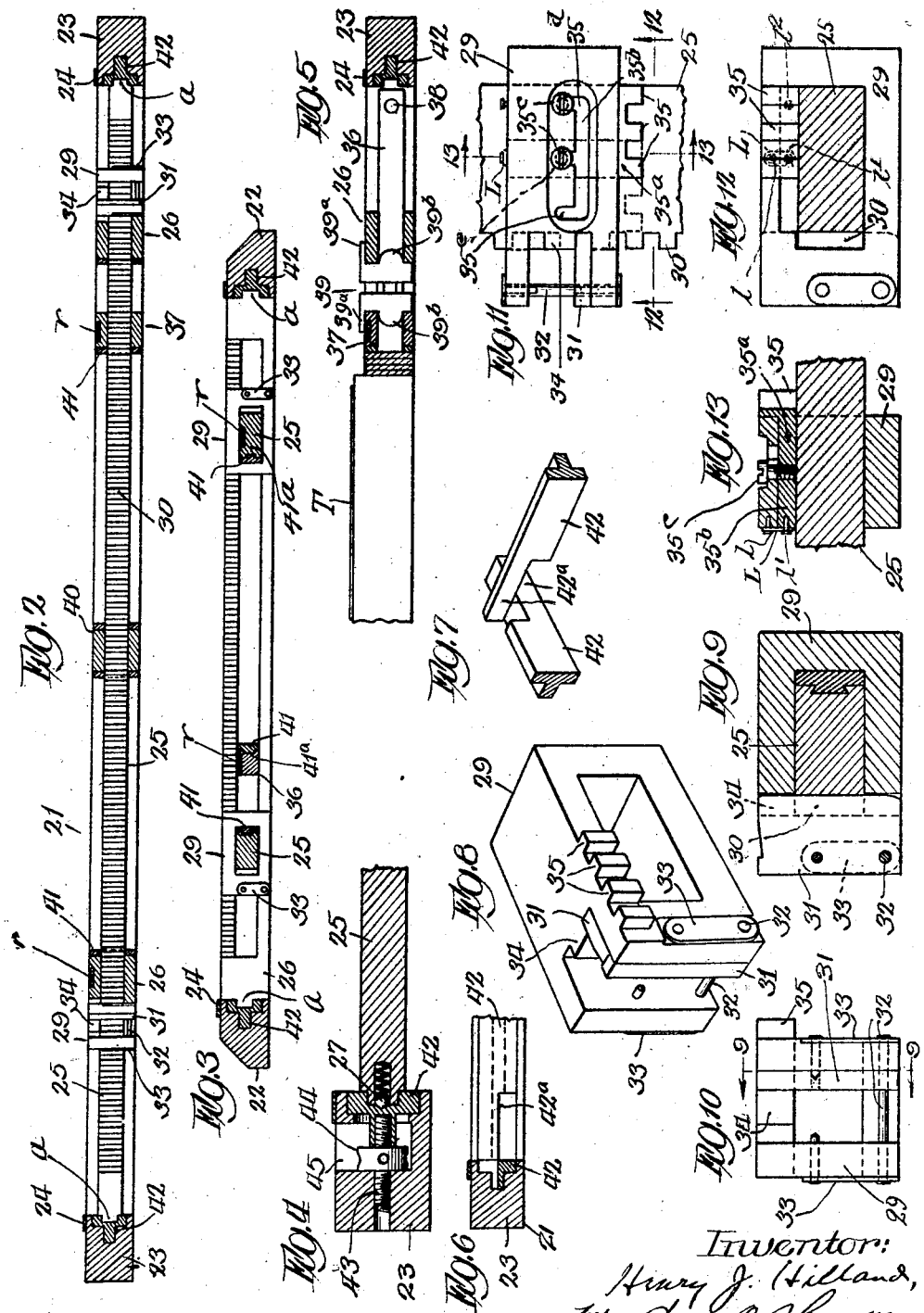

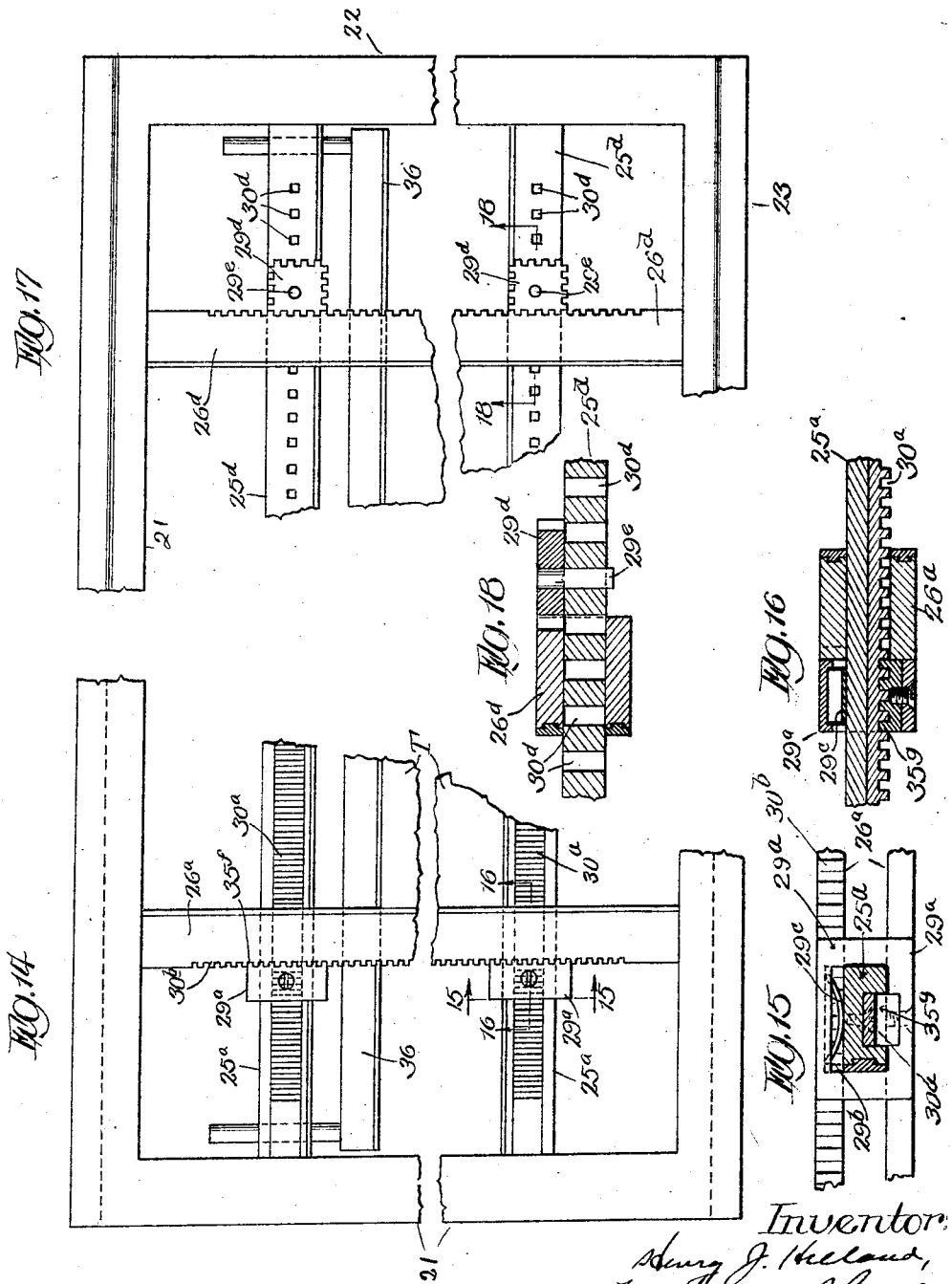

1,525,937

UNITED STATES PATENT OFFICE.

HENRY J. HILLAND, OF CHICAGO, ILLINOIS.

LOCKUP DEVICE FOR PRINTERS' CHASES.

Application filed February 6, 1923. Serial No. 617,226.

*To all whom it may concern:*

Be it known that I, HENRY J. HILLAND, a subject of the Kingdom of Great Britain, and a resident of Chicago, Cook County, Illinois, have invented certain new and useful Improvements in Lockup Devices for Printers' Chases, of which the following is declared to be a full, clear, and exact description.

This invention relates to lock-up devices for printers' chases, and its principal object is to provide improved "lock-up" mechanism for locking up a full chase of type or printers' forms or a partially filled chase without the aid of the usual printers' "furniture." Another object is to provide improved lock-up means whereby type may be locked up in a chase or outside of a chase. Another object is to provide improved lock-up mechanism containing locking mechanism for locking bars which can be readily moved up against the type and quickly locked together against the type. Other objects and advantages will occur in the course of this specification and with all of said objects and advantages in view, this invention consists in the several novel features of construction, arrangement and combination of parts, fully set forth in the following specification, and the essential features of which will be particularly defined in the appended claims.

The invention is clearly illustrated in the drawings accompanying this specification, in which:

Fig. 1 is a plan of a printer's chase and lock-up mechanism embodying the preferred form of the present invention; Fig. 2 is a vertical, longitudinal section taken on the line 2—2 of Fig. 1; Fig. 3 is a vertical, cross section taken on the line 3—3 of Fig. 1; Fig. 4 is a detail, vertical, longitudinal section taken on the line 4—4 of Fig. 1; Fig. 5 is a detail, vertical, longitudinal section taken on the line 5—5 of Fig. 1; Fig. 6 is a detail, vertical, longitudinal section taken on the line 6—6 of Fig. 1; Fig. 7 is a perspective view of fragments of certain supplemental locking bars; Fig. 8 is a perspective view of a certain locking collar; Fig. 9 is a vertical, cross section through said locking collar taken on the line 9—9 of Figs. 1 and 10; Fig. 10 is an end view of the collar seen in Fig. 9; Fig. 11 is a plan of a fragment of the locking collar and one of the locking bars showing a slightly modified form of the invention; Fig. 12 is a detail, vertical section taken on the line 12—12 of Fig. 11; Fig. 13 is a detail, vertical section taken on the line 13—13 of Fig. 11; Fig. 14 is an under plan of a fragment of a printer's chase and lock-up mechanism, showing a modified form of the invention; Fig. 15 is a vertical section taken on the line 15—15 of Fig. 14; Fig. 16 is a detail, vertical section taken on the line 16—16 of Fig. 14; Fig. 17 is a plan of a fragment of a printer's chase and lock-up mechanism showing another slightly modified form of the invention and Fig. 18 is a detail, vertical section taken on the line 18—18 of Fig. 17.

Referring to said drawings and first to Figs. 1 to 10 inclusive, the reference character 21 designates a printer's chase of conventional form, comprising two side frame members 22 and two end frame members 23 united at the corners, as is customary. On the top of the side and end members of said chase may be secured printers' rules or scales 24, for aiding the workman in locating the type in the chase. The printers' rules or scales are marked off in printers' measurements in picas and nonpareils, running in both directions from "zero" which is at the center. (See Fig. 1.) Two locking bars 25 are provided, which run lengthwise of the chase and extend between the inner margins of the end members 23 thereof, and two locking bars 26 are provided, which extend crosswise of the chase between the inner margins of the side members 22 thereof. The crosswise extending locking bars are slotted lengthwise of themselves and the lengthwise extending locking bars 25 extend through said slots. As a preference, the ends of each locking bar is reduced in thickness and run in grooves *a* located at the inner margin of the chase. Each end of the locking bars is provided with a spring pressed ball 27 (see Fig. 4) which is arranged to enter any one of a row of sockets 28, located at the inner margin of the chase, to thereby hold the locking bars against accidental displacement after they have been adjusted into place. Said spring pressed balls act as pawls or detents to hold the locking bars in any position in which they are placed until forcibly moved out of such position. The sockets 28 register with the scale marks of the scales or rules 24, which facilitates the work of placing and holding the locking bars in position when locking up the type in the chase. Any or all of the locking bars and squeeze bars may be provided with thin printers' rules or scales r, let into the upper sides thereof and below the upper faces thereof so as not to interfere with the operation of the locking collars and locking bars.

Means are provided at the intersections of the locking bars for locking them together in locking up the type without placing any strain on the chase itself. In the preferred form, said locking means comprises locking collars 29 (see Figs. 6 to 10 inclusive) which surround the lengthwise extending locking bars 25, there being two collars (one right handed and one left handed) upon each bar and disposed at the outer sides of the crosswise extending locking bars 26. Each locking collar 29 is slidably mounted upon the locking bar 25, associated with it, and is capable of being readily moved up against an associated crosswise extending locking bar 26 and locked to both of them, thereby locking the bars together. As shown, each locking bar 25 is formed with rack teeth 30 along its outer edge and each locking collar has a dog 31, pivotally secured in a recess formed in the side of the locking collar and arranged to enter the spaces between the teeth 30 of the rack bar 25. Each dog 31 is pivotally mounted upon a pivot pin 32 secured in the locking collar, and is held in place in the collar by spring pressed detents 33 that extend through the walls of the locking collar and enter depressions formed in the sides of the dog. The recess in which the dog is contained may be wider than the dog, (see Figs. 8 to 10 inclusive) in order that the dog may be moved laterally upon the pin from one side of the recess to the other in making certain adjustments. A tooth 34 is provided upon the locking collar at the inner side of the recess, midway between the sides thereof. The dog may be placed between the tooth 34 and either side of the recess, and the locking collar is thereby held against the lateral movement relative to the dog whenever the dog is inserted between any two teeth 30 of the rack bar 25. The locking collar 29 is formed on one side with rack teeth 35 which are arranged to mesh with the rack teeth 30 of the crosswise extending locking bars 26.

Associated with one of the locking bars 25 and with one of the locking bars 26 are squeeze bars 36, 37 which extend parallel with said locking bars and are arranged to be placed against the type in locking the same in the chase. As a preference, the squeeze bars are provided with guide pins 38 which extend transversely of the bars and are guided in holes formed in the locking bars 25, 26. Between the locking bars and squeeze bars are placed quoins 39 or other pressure devices for applying pressure between the bars and type. The quoins are tightened up against the locking bars and squeeze bars, as is well understood, to clamp the type in place in the chase. Said quoins are shown as formed with flanges 39$^a$ that overhang the locking bars and squeeze bars, and they may also be formed with protuberances 39$^b$ that enter the slots in the bars 36. In Figs. 1 and 2 are shown type, T, arranged in two separate columns, separated by a space bar 40. The type are shown as secured between the locking bars and squeeze bars and are locked in place in the chase by the locking means above described.

In using the lock-up device of the preferred form, one locking bar 25 and one locking bar 26 are placed against the type along two sides, the squeeze bars 36, 37 and their associated locking bars are moved up, bringing said squeeze bars against the other two sides of the type. The locking collars are then slid along the locking bars 25 until they engage the locking bars 26, and the teeth thereof enter the teeth of the locking bars 26. In case the dogs 31 strike against the teeth of the bars 25, or the teeth 35 of the collar strike against the teeth of the locking bars 26, the dogs and spacers are adjusted, as above set forth, to bring the dogs and the teeth of the spacers into the spaces between the teeth of the locking bars. After locking bars have been locked together by the collars, the quoins are tightened up to put pressure upon the squeeze bars which in turn put pressure upon the type and the form is ready for use. To lock the job in the center of the chase, and assuming that the job is 50 picas long and 30 picas wide, the locking bar 30 is moved to the point 25 at the left on the scale, which now locates the left end of the job, and the other end thereof stands at the point 25 at the right on the scale. The squeeze bar 37 and associated locking bar 26 are then moved up, bringing the squeeze bar against the type. The other locking bars and squeeze bars are manipulated in the same manner, using the point 15 on the scales for determining the position of the job. The collars are then moved up into mesh with the bars and the quoins tightened up.

In order to secure a better hold against the type, I have provided the bars with friction facing strips 41, which may be secured in the bars by dovetailed ribs 41$^a$ formed upon the inner sides of the strips and let into dovetailed grooves formed in the sides of the bars. The friction strips are arranged to engage with the type, and being softer, and not so smooth as the metal bars, they take a better grip on the type. They may be provided in any or all of the locking bars and squeeze bars as desired.

It is sometimes necessary to practically fill the chase with type, in which case the locking bars and locking collars are omitted, and in order to lock up the type without furniture I have provided supplemental T-shaped locking bars 42 (see Figs. 4, 5, 6 and 7) that are let into T-shaped grooves formed in the inner edges of the chase. At spaced intervals along the side and end members of the chase, are right and left hand adjustment screws 43, which are threaded in the chase members and in the supplemental locking bars 42 and have enlarged heads 44 between their ends which are formed with holes in which a tool may be placed to turn the adjustment screws. The frame members of the chase are formed with recesses 45 to receive the heads 44 and to admit the tool which is used in turning the adjustment screws. With this supplemental locking bar arrangement, the chase may be practically filled with type and the latter locked in place without the locking bars, collars, quoins or any furniture. The ends of the supplemental locking bars are formed with overlapping portions $42^a$ so as to permit the bars to pass each other when being moved out of the grooves and into the opening of the chase.

Sometimes in adjusting the locking bars 25 against the type, it is found that said bars will stop at a place where the teeth 35 of the locking collars will not enter the spaces between the teeth of the locking bars 26 but will strike against the teeth themselves. To overcome this difficulty, I have formed the teeth 35 on an adjustable spacer $35^a$ (see Figs 11, 12 and 13) which has a web portion $35^b$ that is slidably held in a recess formed in the under side of the top of the locking collar 29. The spacer $35^a$ is arranged to be held by the collar in two positions of adjustment, whereby in case the teeth 35 thereof strike against the teeth of the locking bar 26, the spacer may be moved to one side or the other to bring the teeth 35 into register with the spaces between the teeth of the locking bar 26. As shown, the spacer $35^a$ has pins $35^c$ secured therein, which project up through a slot $35^d$ formed in the upper part of the locking collar and said pins are arranged to enter transverse portions $35^e$ of said slot $35^d$ where the pins and spacer are held against lateral movement. The pins are shown as comprising headed screws, the heads of which enter a depression formed in the upper face of the locking collar. On the collar is a latch L, which is arranged to engage with a pin 1 on the collar and with either pin $1^1$, $1^2$, on the spacer to prevent accidental displacement of the spacer.

In the modified form illustrated in Figs. 14, 15 and 16, the rack teeth $30^a$ are formed on the under side of the locking bars $25^a$ and the locking collars $29^a$ have teeth $35^f$ on one side, which engage with the rack teeth $30^b$ of the locking bars $26^a$, and are also formed with teeth $35^g$ on the inside of the collar, that engage with the teeth $30^a$ of the locking bars $25^a$. The hole $29^b$ of the locking collar is made high enough to permit the locking collar to be depressed so as to disengage the teeth $35^g$ thereof from the teeth $30^a$ of the locking bar $25^a$, and a flat spring $29^c$ is contained in the collar, which bears upon the top of the locking bar $25^a$ and normally holds the collar in its raised position with the teeth $35^g$ thereof in mesh with the teeth of the locking bar $25^a$. To disengage the collar from the bar $25^a$ the collar is depressed and moved along the bar to the desired place. When released, the spring $29^c$ raises the collar and meshes the teeth $35^g$ thereof with the teeth $30^a$ of the locking bar $25^a$.

In the form illustrated in Figs. 17 and 18, in place of locking collars 29, $29^a$, toothed locking blocks $29^d$ are employed which have teeth on their four sides that may be meshed with the teeth of the locking bars $26^d$. Each locking block $29^d$ has a non-circular pin $29^e$ projecting down therefrom, which is arranged to enter any one of a number of non-circular holes $30^d$ formed in the locking bars $29^d$, and said pin $29^b$ is placed at one side of and above the center of the block $29^d$, in order that adjustment may be effected between the locking bars $25^d$, $26^d$ to accommodate said bars to the type which are to be locked thereby.

One of the principal advantages of using locking collars is that there is less liability for the collars to become separated from the locking bars than where pin, wedges, or other loose objects are employed for locking the locking bars together. Another advantage of the present invention is that the type may be locked up without the use of a chase and may be stored away or used in taking proof or may be used in presses where no regular chase is required. Another advantage is that the locking bars may be adjusted to the exact position desired by reason of the adjustable features of the locking collars. Other advantages are that by the use of friction facing strips any form can be securely locked up without any metal parts coming in contact with the form and this insures a better and more secure lock-up than those of the present day system, where metal bars are locked against metal type; that system makes an uncertain and unsecure lock-up. That with friction facing strips fitted to the T shaped locking bars a full sized form up to the entire full dimensions of the chase, can be securely locked up without any metal parts touching the form or without the use of any so-called printers' furniture, quoins, wedges or blocks of any kind being employed. That a form can be locked up upon the press without the customary method of taking chase off the press, by the use of the spring pressed balls that enable the bars to stay in any position placed, without falling down. That all locking collars will mesh regardless of size of form upon all occasions by the use of the movable spacer or dog or pawl. That the combination of parts can be fitted to any flat bed press, vertical press, proof press or any make of presses to enable the printer to lock up forms without using any chase or so called furniture. That all the bars, friction facing strips, printers' rules, locking collars and all other parts are interchangeable. That the chase, fitted with the combination of bars and sliding quoins is a complete unit in itself and all parts are fitted to prevent the locking collars, squeezing bars and sliding quoins from falling off the chase, making it safe against loss of parts. That by using the four sided toothed pins, four different adjustments can be had in printers' picas, nonpareils or points by simply turning pin around.

More or less variation as to the exact details of construction is possible without departing from the spirit of this invention; I desire, therefore, not to limit myself to the exact form of the construction shown and described, but intend in the following claims, to point out all of the invention disclosed herein.

I claim as new and desire to secure by Letters Patent:

1. In a lock-up device for printers' chases, the combination of two spaced, parallel locking bars, two spaced, parallel locking bars extending crosswise thereof and intersecting said first mentioned locking bars, and locking collars slidably mounted on certain of said locking bars, each collar having interlocking connections with two intersecting bars at a plurality of places thereon.

2. In a lock-up device for printers' chases, the combination of two spaced, parallel, slotted locking bars, two spaced, parallel locking bars, extending crosswise of and through the slots of said first mentioned locking bars, and locking collars slidably mounted on said second named locking bars, each collar having interlocking connections with two intersecting locking bars at a plurality of places thereon.

3. In a lock-up device for printers' chases, the combination of two spaced, parallel and slotted locking bars, two spaced, parallel locking bars having rack teeth thereon and extending crosswise of and through the slots of said first mentioned locking bars, and locking collars slidably mounted on said first mentioned locking bars and having interlocking connections therewith at a plurality of places thereon, said collars having also rack teeth adapted to intermesh with the rack teeth of the second mentioned locking bars.

4. In a lock-up device for printers' chases, the combination of two spaced, parallel locking bars, two spaced, parallel locking bars having rack teeth thereon and extending crosswise of and intersecting said first mentioned locking bars, and locking collars mounted on said first mentioned locking bars and having interlocking connections therewith at a plurality of places thereon, said collars having also rack teeth adapted to intermesh with the rack teeth of the second mentioned locking bars.

5. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having means interlocking with the teeth of the bar on which it is mounted, and with the teeth of an intersecting bar.

6. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a movable dog arranged to engage with the teeth of the bar on which the collar is mounted, and having rack teeth arranged to intermesh with the teeth of an intersecting bar.

7. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a movable dog arranged to engage with the teeth of the bar on which the collar is mounted, and having interlocking means arranged to interlock with the teeth of an intersecting bar.

8. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a dog pivoted therein arranged to intermesh with the teeth of the bar on which the collar is mounted, said dog being adjustable laterally in its collar into two fixed positions therein, and said collar having also interlocking means arranged to interlock with the teeth of an intersecting bar.

9. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a dog pivoted therein arranged to intermesh with the teeth of the bar on which the collar is mounted, said dog being adjustable laterally in its collar into two fixed positions therein, and there being latches for holding said dog in said fixed positions.

10. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a dog pivoted therein and arranged to intermesh with the teeth of the bar on which said collar is mounted, and having also a spacer formed with rack teeth arranged to mesh with the teeth of an intersecting bar, said spacer having two fixed positions of adjustment in said collar.

11. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a dog pivoted therein and arranged to intermesh with the teeth of the bar on which said collar is mounted, and having also a spacer formed with rack teeth arranged to mesh with the teeth of an intersecting bar, said spacer being adjustable laterally of the collar and having pins extending through a notched slot in said collar whereby it may be held in two fixed positions of adjustment in the collar.

12. In a lock-up device for printers' chases, the combination of two spaced, parallel locking bars, having rack teeth along their outer edges, two spaced, parallel locking bars having rack teeth along their outer edges and extending crosswise of and intersecting said first mentioned locking bars, and locking collars slidably mounted on said first mentioned bars, each collar having a dog pivoted therein and arranged to intermesh with the teeth of the bar on which said collar is mounted, and having also a spacer formed with rack teeth arranged to mesh with the teeth of an intersecting bar, said spacer being adjustable laterally of the collar and having pins extending through a notched slot in said collar whereby it may be held in two fixed positions of adjustment in the collar, and there being a latch between said collar and spacer for securing it in said fixed positions of adjustment.

HENRY J. HILLAND.